C. LE G. FORTESCUE.
TELEGRAPH CIRCUIT.
APPLICATION FILED NOV. 3, 1916.

1,315,953.

Patented Sept. 16, 1919.

WITNESSES:

INVENTOR
Charles Le G. Fortescue.
BY
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

TELEGRAPH-CIRCUIT.

1,315,953.

Specification of Letters Patent.

Patented Sept. 16, 1919.

Application filed November 3, 1916. Serial No. 129,277.

*To all whom it may concern:*

Be it known that I, CHARLES LE G. FORTESCUE, a subject of the King of England, and a resident of Pittsburgh, in the county of Allegheny and State of Pennsylvania, have invented a new and useful Improvement in Telegraph-Circuits, of which the following is a specification.

My invention relates to protective means for intelligence-transmission circuits and it has special relation to means for protecting the operating instruments of such circuits from inductive disturbances that may be impressed thereupon by reason of the currents flowing in adjacent circuits, such as alternating-current railway systems, power-distributing systems and the like.

When an electrical circuit over which alternating currents of appreciable value flow is parallel and adjacent to an intelligence-transmission circuit, inductive disturbances are impressed upon the intelligence-transmission circuit which are manifested by the flow therein of alternating currents. The induced alternating currents are sometimes of sufficient magnitude to prevent the satisfactory operation of the operating instruments connected in the intelligence-transmission circuit. For instance, the relays, and especially polarized relays, are frequently disturbed to such an extent that their operation is entirely unreliable, the intelligence-transmission circuits being thereby rendered useless.

The object of my present invention is to provide means for effectively precluding these induced currents from flowing through the operating instruments connected in the intelligence-transmission circuit. By means of my present invention, the alternating currents induced in the intelligence-transmission circuit may flow to ground over a path of low impedance while the operating currents are confined to the instruments associated with the circuit. In consequence thereof, the operation of the instruments is reliable although disturbances are imposed on the intelligence-transmission conductor. The disturbing currents are thus precluded from interfering with the operating currents employed for message-transmitting purposes.

Figure 1:
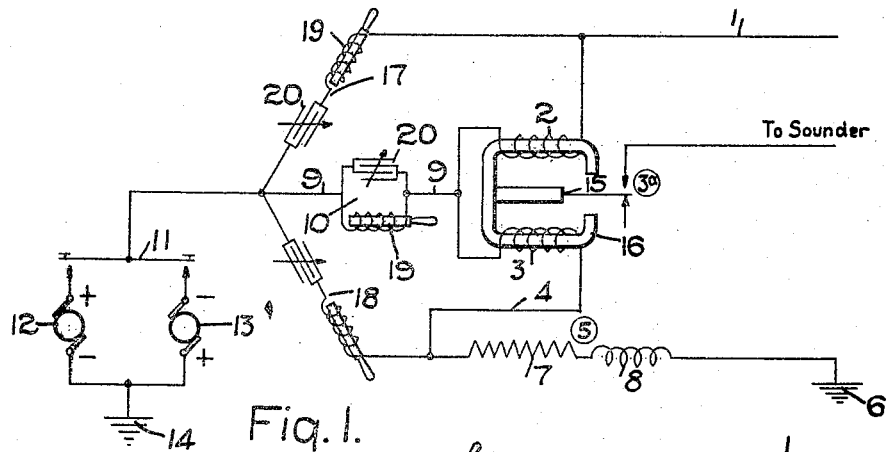
Figure 2:
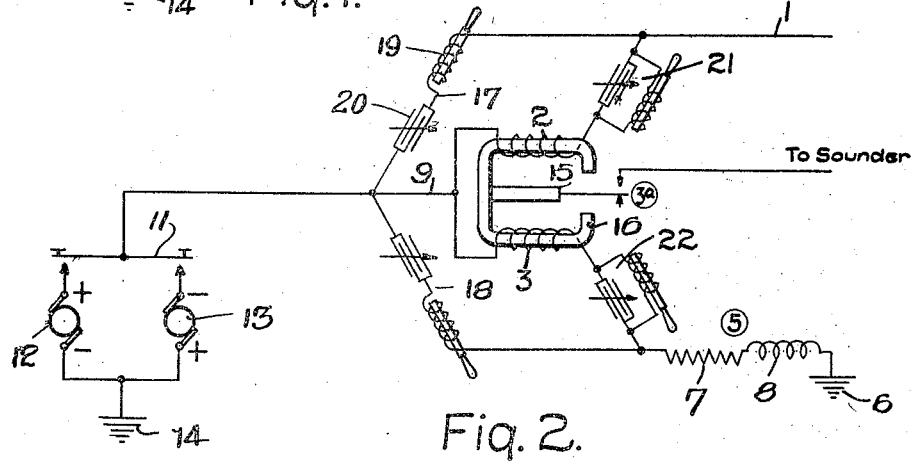

For better understanding of the nature and scope of my invention, reference may be had to the following description and the accompanying drawings in which Figure 1 is a diagrammatic view of a portion of a telegraph circuit showing an operating instrument protected by means of my invention, and Fig. 2 is a similar view showing a modification of the protective system of Fig. 1.

It is presumed that the telegraph line conductor 1 is subjected to inductive influences arising from the flow of alternating currents in an adjacent power circuit (not shown). The disturbing circuit from which the inductive disturbances arise may be a power-distributing circuit or, as more frequently is the case, an alternating-current railway system. It is presumed that the alternating currents induced in the telegraph conductor 1 are of sufficient magnitude to seriously interfere with the reliable operation of the instruments employed for message-transmitting purposes.

The line conductor 1 is associated with similar operating instruments at each of its terminals, but I have shown only the instruments connected at one terminal, since the connections obtaining at the other terminal of the conductor 1 are similar.

The line conductor 1 is connected to a coil 2 of a polarized relay $3^a$, such as is commonly employed in duplex telegraph systems. The coil 2 is associated with a differentially-wound coil 3 having one of its terminals connected to a conductor 4 that, in turn, connects the coil 3 in series circuit with an artificial line 5. The artificial line 5 is connected to ground at 6 and comprises a resistor element 7 and an inductive element 8, the resistor and the inductive elements being so chosen that the artificial line 5 is electrically balanced with the transmission-line conductor 1.

Corresponding terminals of the coils 2 and 3 are connected to a common conductor 9 which, in turn, is connected, through a parallel resonant circuit 10, to the operating key 11. The key 11 may engage, at will, the positive terminal of a direct-current source 12 or the negative terminal of a direct-current source 13, the negative and positive terminals of the said sources 12 and 13 being respectively connected to ground at 14.

The polarized relay 3ª is of a usual form of construction and responds to currents flowing in one direction only. In order that an armature 15 thereof, which controls the energization of the sounder circuit (not shown) may be under a slight normal magnetic attraction when no signals are passing between the said terminal stations, it is given a slight bias or so adjusted that it is nearer one pole piece of the magnetizable core member 16 than the other. The polar relay being differentially wound, is neutral to out-going currents from the key 11 if the artificial line conductor 5 is electrically balanced with the transmission-line conductor 1. When the operating key associated with a distant station is closed, the current traversing the coil 2 of the polarized relay sufficiently energizes the coil to overcome the attraction produced by the coil 3. This action actuates the armature 15 and thereby energizes the local sounder circuit. If the key 11, however, is closed, the relay is not affected, since equal currents traverse the coils 2 and 3.

Since the polarized relay 3ª is actuated by in-coming currents traversing the line conductor 1, it would, under ordinary circumstances, be actuated by alternating currents induced in the line conductor 1. To this end, series resonant circuits 17 and 18 are connected in shunt to the coils 2 and 3 and to the common conductor 9. Each of the series resonant circuits comprises an adjustable inductive reactance element 19 and an adjustable condensive reactance element 20. The electrical constants of these elements are severally adjusted so that alternating currents of the frequency of those induced in the line conductor 1 may flow through the circuits 17 and 18 substantially unimpeded.

To further impede the flow of these induced alternating currents through the coil 2 of the polarized relay, the parallel resonant circuit 10, likewise comprising a condensive element 20 and a reactance element 19, is connected in series circuit with the coil. This circuit is also tuned to the frequency of the alternating currents induced in the telegraph conductor 1 and, consequently, offers a very high impedance to the flow of such currents therethrough.

Since series resonant circuits are connected in shunt to the coils of the relay, and a parallel resonant circuit is connected in series with that coil of the relay which is susceptible to the flow of induced alternating currents, the polarized relay 3ª is effectively protected against outside disturbances.

In the circuit shown in Fig. 2, the parallel resonant circuit 10 of Fig. 1 has been eliminated, but parallel resonant circuits 21 and 22, which are tuned to the frequency of the alternating currents induced in the line conductor 1, are connected in series circuit with the coils 2 and 3, respectively. Each coil of the polarized relay 3ª is, therefore, separately associated with a parallel resonant circuit which substantially precludes the flow of alternating currents of a certain frequency through said coils. The circuit 22 is associated with the coil 3 in order that the artificial line 5 may possess the same electrical constants as the transmission-line conductor 1, the parallel resonant circuit 21 and the coil 2.

The operating currents of the circuit, such as those that originate in the sources 12 and 13, may flow through the inductive devices 19 of the resonating circuits. The flow of direct currents through the inductive elements will, in no wise, affect their action when these elements are subjected to the flow of alternating currents.

While I have shown and described one embodiment of my invention, it will be understood that many modifications may be made therein without departing from the spirit and scope of the appended claims.

I claim as my invention:

1. In an intelligence-transmission circuit, the combination with a transmission-line conductor, of an operating instrument connected thereto and susceptible to the influence of alternating currents induced in said conductor, series resonant and parallel resonant circuits tuned to the frequency of the induced alternating currents and connected, respectively, in shunt to, and in series relationship with, said operating instrument.

2. In an intelligence-transmission circuit, the combination with a transmission-line conductor, of an operating instrument connected thereto comprising two reversely wound coils jointly influencing a common armature, one of said coils being connected to said line conductor and the other coil being connected to an artificial line conductor having electrical constants equal to those of the transmission-line conductor, a series resonant circuit tuned to a certain frequency and connected in series with said line conductor and in shunt to said coils, and means for conducting all of the alternating currents traversing said series resonant circuit with minimum impedance, to ground.

3. In an intelligence-transmission circuit, the combination with a transmission-line conductor, of a polarized instrument connected thereto comprising two reversely wound coils, series resonant circuits tuned to a certain frequency and connected in shunt to said coils, and at least one parallel resonant circuit tuned to the same frequency and connected in series with said coils, whereby all alternating currents having the same frequency at which said resonating circuits are tuned may be effectively precluded from flowing through said polarized instrument.

In testimony whereof, I have hereunto subscribed my name this 25th day of October, 1916.

CHARLES LE G. FORTESCUE.